United States Patent [19]

Kourtides

[11] Patent Number: 5,399,019
[45] Date of Patent: Mar. 21, 1995

[54] METHOD AND APPARATUS FOR MEASURING TEMPERATURES IN FABRICS AND FLEXIBLE THERMAL INSULATIONS

[75] Inventor: Demetrius A. Kourtides, Gilroy, Calif.

[73] Assignee: The United States of America as represented by the Administrator of the National Aeronautics and Space Administration, Washington, D.C.

[21] Appl. No.: 96,540

[22] Filed: Jul. 26, 1993

[51] Int. Cl.⁶ .................. G01K 1/14; G01K 1/10; G01K 1/12; G01K 7/04
[52] U.S. Cl. .................. 374/208; 374/179; 136/230; 136/233
[58] Field of Search .......... 374/179, 208, 139, 140; 136/230, 232, 233, 234

[56] References Cited

U.S. PATENT DOCUMENTS

| | | | |
|---|---|---|---|
| 2,948,766 | 8/1960 | Schneider et al. | 136/232 |
| 3,278,341 | 10/1966 | Gee | 136/234 |
| 3,554,816 | 1/1971 | Moen | 136/233 |
| 3,580,744 | 5/1971 | Inouye et al. | 136/234 |
| 3,610,045 | 10/1971 | Shearman | 374/139 |
| 3,680,382 | 8/1972 | Vaiden | 374/140 |
| 3,802,926 | 4/1974 | Blencowe | 136/232 |
| 3,956,936 | 5/1976 | Brixy | 136/233 |
| 4,018,624 | 4/1977 | Rizzolo | 374/179 |
| 4,102,708 | 7/1978 | Dancy | 136/233 |
| 4,128,734 | 12/1978 | Straitz, III | 136/232 |
| 4,164,433 | 8/1979 | Granahan et al. | 136/233 |
| 4,216,028 | 8/1980 | Kurita | 136/234 |
| 4,305,286 | 12/1981 | Beuth et al. | |
| 4,381,333 | 4/1983 | Stewart et al. | |
| 4,433,198 | 2/1984 | Berner et al. | |
| 4,863,280 | 9/1989 | Doemens | |
| 4,871,263 | 10/1989 | Wilson | 374/140 |
| 4,896,847 | 1/1990 | Gertsch | |
| 4,929,093 | 5/1990 | Suzuki et al. | |

FOREIGN PATENT DOCUMENTS

| | | | |
|---|---|---|---|
| 0291209 | 6/1914 | Germany | 136/232 |
| 1-299423 | 12/1989 | Japan | 374/208 |
| 0235308 | 3/1945 | Switzerland | 136/232 |
| 0007910 | of 1908 | United Kingdom | 136/234 |

OTHER PUBLICATIONS

Winkler, J. B. "Liquid Iron and Steel Temperatures in Practice," Blast Furnace and Steel Plant, pp. 536-538 (May 1949).

*Thermal Response of Rigid and Flexible Insulations and Reflective Coating in an Aeroconvective Heating Environment*; by D. A. Kourtides, S. A. Chiu, D. J. Iverson, and D. M. Lowe, Mar., 1992, –NASA Technical Memorandum.

*Primary Examiner*—Diego F. F. Gutierrez
*Attorney, Agent, or Firm*—Kenneth L. Warsh; Guy M. Miller; Harry Lupuloff

[57] ABSTRACT

A temperature sensor uses a type R thermocouple wire element in a ceramic sheath to sense temperatures up to 3,200° F., and is particularly suitable for flexible insulations. The sensor includes a thermocouple wire embedded in a sheath having two sections disposed at right angles to each other. The junction of the thermocouple is located at one end of one of the sections and the lead wires extend from the other section. The section which includes the junction is secured to a flexible surface with ceramic cement.

8 Claims, 2 Drawing Sheets

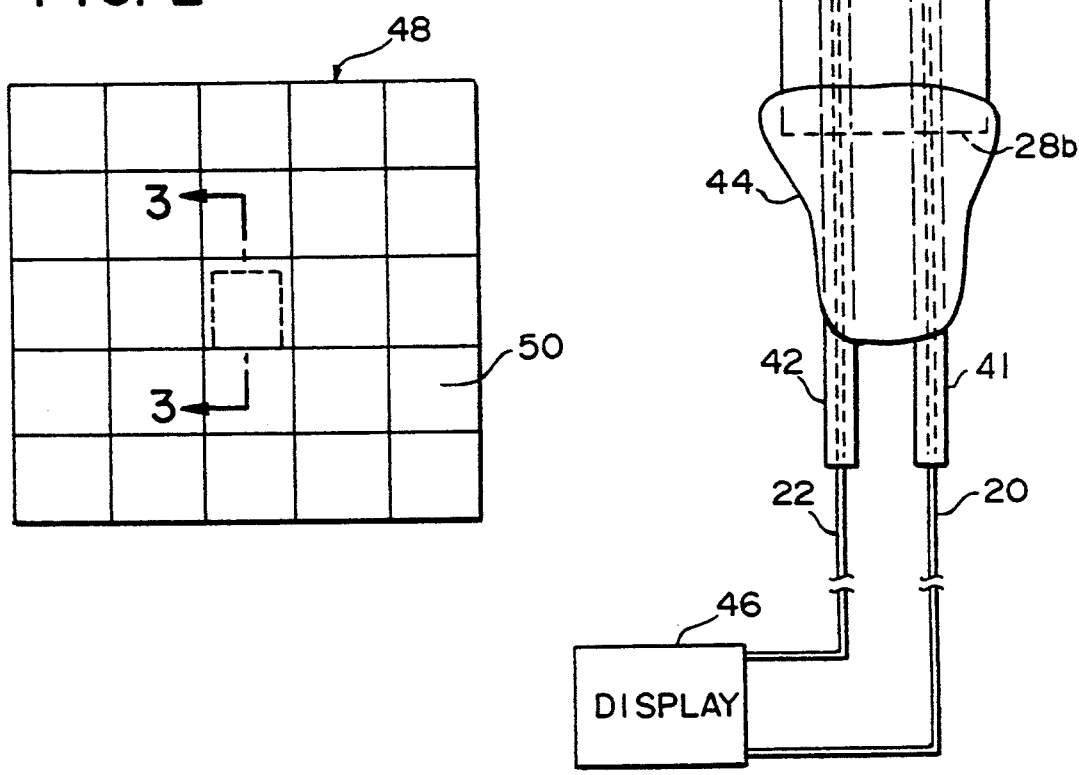

METHOD AND APPARATUS FOR MEASURING TEMPERATURES IN FABRICS AND FLEXIBLE THERMAL INSULATIONS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The present invention relates generally to temperature sensors suitable for sensing temperatures on the surface or within flexible insulations, and more specifically, to a temperature sensor having a two bore thin wall alumina tubing containing a type R (Platinum/-Platinum/Rhodium) thermocouple wire. The sensor is bonded with alumina adhesive to the unexposed bottom surface of the top fabric of an insulation thus permitting the accurate detection of the surface temperature of the insulation.

TECHNICAL FIELD OF THE INVENTION

Temperature sensing devices, and in particular thermocouple elements and thermocouple assemblies, are well known in the art. Various types of temperature sensing thermocouples are described in *The Temperature Handbook*, published by OMEGA Engineering Inc. of Stamform, Conn. The thermocouple sensors described therein are suitable for installation on rigid surfaces such as rigid insulations or tiles.

In general, the prior art thermocouple temperature sensing devices are limited to an operating temperature of 2700° F. in an oxidizing atmosphere. In addition, the sheath material is composed of Pt-Rh alloys which are susceptible to attack by silica at high temperatures (silica is extensively used both as an insulation and fabric material in flexible insulations).

With respect to flexible insulations, the configuration of prior art sensors does not permit their installation at a precise location within a flexible insulation. Temperature sensing in flexible insulation has in the past involved positioning a bare thermocouple element within the fabric or insulation. The unprotected element is destroyed at temperatures of greater than 2700° F. in an oxidizing atmosphere. In addition, the bare element does not stay in position, and thus it is not possible to know the temperature at a fixed location.

Various United States patents have described thermocouple temperature sensors. U.S. Pat. No. 4,305,286 to Beuth et al. describes a thermocouple encased in ceramic tubing for measuring the temperature inside a reactor. The focus of the description is on the process and use of a large device to measure internal temperatures. The patent does not describe temperature measurement on the surface of, or inside of, flexible insulations.

U.S. Pat. No. 4,413,198 to Berner et al. describes a process for measuring temperatures in elastomeric seals. The sensor uses type K and chrome-alumel thermocouples with "O" elastomeric rings to measure lower temperatures, such as below 200° C. The sensor described therein is not suitable for measuring high temperatures in insulations because the seals will degrade at elevated temperatures. Moreover, the thermocouple wire is of an unsuitable material for high temperatures, and the wire is not encased in ceramic to protect it at high temperatures.

U.S. Pat. No. 2,863,280 to Doemens describes the use of sound and ultrasound in various machines and equipment to measure temperatures inside machinery. The patent does not describe the use of a thermocouple wire encased in alumina to measure temperatures.

U.S. Pat. No. 4,896,847 to Gertsch describes a deployable retractable aerobrake which includes a flexible thermal blanket. The patent does not describe the use of temperature sensors.

U.S. Pat. No. 4,929,093 to Suzuki et al. describes the use of platinum wire enclosed by a protective cover. The sensor includes an electrically conductive net, which is metal, an electrically conductive resin and a metal sheet which is painted. The device is designed to detect only temperature rise due to the presence of a fire and not to measure temperatures continuously at high temperatures.

While temperature sensors and their installation on rigid surfaces such as rigid insulations or tiles are well known, a need exists for sensors having the capability to accurately detect high temperatures in flexible fabrics and flexible insulations.

SUMMARY OF THE INVENTION

An object of the present invention is to provide a temperature sensing device which can be installed in a fixed position in a flexible insulation, thus determining the temperature in a known exact position in the flexible insulation.

Another object of the present invention is to provide a reusable temperature sensing device which can measure temperatures at the range of 100° to 3200° F. in an oxidizing and aeroconvective environment without damage to the device or the temperature sensing wire.

Another object of the present invention is to provide a temperature sensing device capable of measuring temperatures in a severe high temperatures oxidative environment, such as an aeroconvective heating environment experienced by space vehicles entering the earth atmosphere.

Still another object of the present invention is to provide a temperature sensing device which is easy to fabricate and install in a flexible insulation.

These and other objects of the invention are met by providing a temperature sensor which includes a thermocouple wire element having first and second wire segments joined to form a junction and a pair of leads, a refractory sheath encasing the junction and at least a portion of the first and second wire segments, and means for securing the junction on a surface of an insulative member having an opposite surface exposed to a high temperature source.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

FIG. 1 is a side elevational view of a temperature sensor according to a preferred embodiment of the present invention;

FIG. 2 is a schematic top plan view of a composite flexible blanket insulation (CFBI) into which the sensor of the present invention is installed;

DETAILED DESCRIPTION OF THE INVENTION

Figure 3:
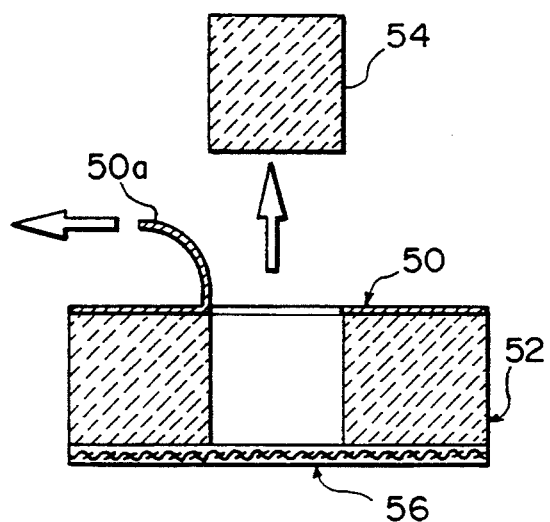
FIG. 3 is an enlarged partial sectional view taken along line 3—3 of FIG. 2, showing removal of an insulation square for installation of the sensor in the CFBI.

Referring initially to FIG. 1, a temperature sensor 10 includes a thermocouple wire element 12 having first and second wire segments 14 and 16 joined at one end to form a junction 18 and at the opposite end a pair of leads 20 and 22. Preferably the wire element 12 is a type "R" (Platinum-Platinum/Rhodium) thermocouple wire having a 0.010 inch diameter. The Platinum/Rhodium segment contains 13% Rhodium.

A refractory sheath 24 encases the junction 18 and at least a portion of the first and second wire segments 14 and 16. The sheath is made of two ceramic tubular sections 26 and 28, each having a pair of longitudinal passages 30, 32 and 34, 36, respectively. Each section 26 and 28 is preferably made of a refractory material such as alumina ($Al_2O_3$). Preferably the alumina is 99.8 percent alumina. In a particularly preferred embodiment, the sections are one inch long and have a diameter of 0.0625 inch (dimensions are exaggerated in FIG. 1 for clarity of detail). The passageways are each 0.016 inch in diameter. The sections are sold by Coors Porcelain Co., Golden Colo. USA as part no. "65670-12".

The two ceramic sections 26 and 28 have juxtaposed, proximal ends 26a, 28a and opposite distal ends 26b, 28b, respectively, and are disposed at a right angle to each other. The junction 18 is disposed outside and juxtaposed to the distal end 26b of the ceramic section 26. The first and second leads 20 and 22 extend outwardly from the distal end of the ceramic section 28.

The junction 18, or "thermocouple weld", is covered with a cap 38 made of ceramic cement such as Cotronics 989, made by Cotronics Corp. of Brooklyn, N.Y. USA. The cement is made of high purity alumina and is workable up to or beyond 3,000° F. The thermocouple junction 18 should not protrude more than approximately 0.06 inch from the end of the section 26. A joint 40 made of ceramic cement is also used to cover the wires between the two ceramic sections 26 and 28. The sheath 24 thus includes sections 26 and 28, cap 38 and joint 40.

First and second sleeves 41 and 42 cover the leads 20 and 22, respectively, and have ends which abut the end 28b of the ceramic section 28. A room temperature vulcanizing (RTV) silicone rubber sealant 44 seals the area of abutment. Preferably, the sleeves 41 and 42 have an inner diameter of 0.016 inch and a wall thickness of 0.001 inch, and are made of polyamide material. The sleeves can be purchased from Micro ML Tubing Sales, of Elmhurst N.Y. USA.

Assembly of the Sensor

Still referring to FIG. 1, the sensor 10 is assembled by at first cutting two sections 26 and 28 of alumina ceramic tubing to specified lengths using an abrasive saw or blade to give a smooth cut. Other suitable means for cutting or otherwise forming the sections can be employed. Any sharp edges should be removed with abrasive paper after cutting. The tubing is preformed with two longitudinal passages extending from end to end. Next, the two ends of two type "R" thermocouple wires 14 and 16 are passed through the longitudinal passages 30, 32, 34, and 36 of the two ceramic elongated bodies and then a thermocouple junction 18 is formed at the end 26b of section 26. Then, the thermocouple junction 18 is formed with the ends of the thermocouple wires 14 and 16 outside the first ceramic elongated section 26. The thermocouple junction 18 is made as close as possible to the end of the section.

Next the first and second ceramic sections 26 and 28 are axially aligned and spaced apart by about 0.1 inch and from that position, they are moved into a position of being at a right angle to each other. The direction of the bend should be such that the thermocouple wires remain apart from each other, i.e., bending should take place perpendicular to the plane formed by the two wires. After bending, it should be confirmed that the two wires do not touch each other.

Ceramic cement is then applied to the area between the two wire, in the bend area, and the thermocouple junction 18 at the end 26b. The cement should be applied when slightly less viscous than toothpaste, or it will skin over and become non-wetting before application to the assembly is possible.

After applying the cement it should be confirmed that no bare thermocouple wire is visible in the areas of cement application. The cement is then allowed to dry according to manufacturer's specifications. After drying, any rough edges of the dried ceramic cement are smoothed with abrasive paper, but care must be taken not to expose or damage the thermocouple wires.

Next, two pieces of polyimide sleeving, one four inches long and one six inches long are cut. The four inch piece and then the six inch piece are placed on the exposed portions of one of the thermocouple wires. Two more pieces are cut for the other wire and the sleeving step is repeated. A small amount of RTV sealant 44 is applied to the ceramic-polyimide junction to provide some strain relief. The RTV sealant is allowed to dry in accordance with manufacturer's specifications. The sensor is thus completed and ready for installation.

Installation of the Sensor

The sensor 10 is particularly well suited for sensing temperatures on the surface or within flexible insulation. For example, a composite flexible blanket insulation (CFBI) has been suggested for use as a thermal protection system for the aerobrake of a space reentry vehicle. This insulation would include a silicon carbide fabric outer layer, followed by an alumina insulation and then alternating layers of aluminized polyimide films. Next is an aluminoborosilicate scrim cloth and a bottom layer of aluminoborosilicate fabric. The various layers are then sewn together with silicon carbide thread.

A CFBI 48 is shown schematically in FIG. 2. A grid pattern if formed by the silicon carbide thread stitching. Once a sensor location has been determined, a three-sided incision is made in the inner fabric layer 50, preferably as a one inch square. As shown in FIG. 3, a piece 50a of the layer 50 is folded back to expose the insulative core 52. A one inch square 54 of the core 52 is then cut out and removed to expose the outer layer 56, the outer surface of which is to be exposed to a high temperature source. An Exactor knife can be used to cut through the core 52. The square 54 is saved for reinsertion.

Figure 4:
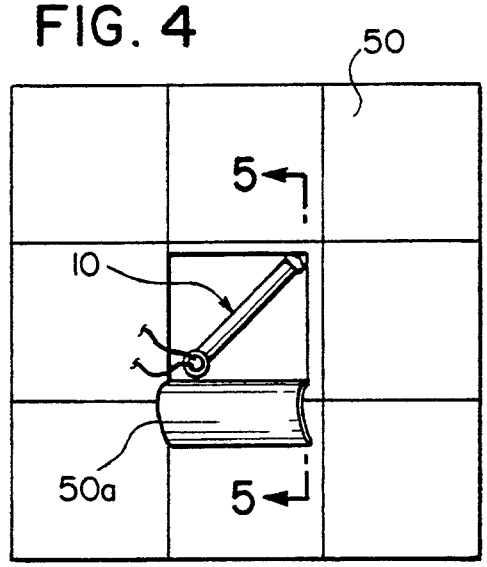
FIG. 4 is an enlarged partial top plan view of the CFBI after insertion of the sensor.
Figure 5:
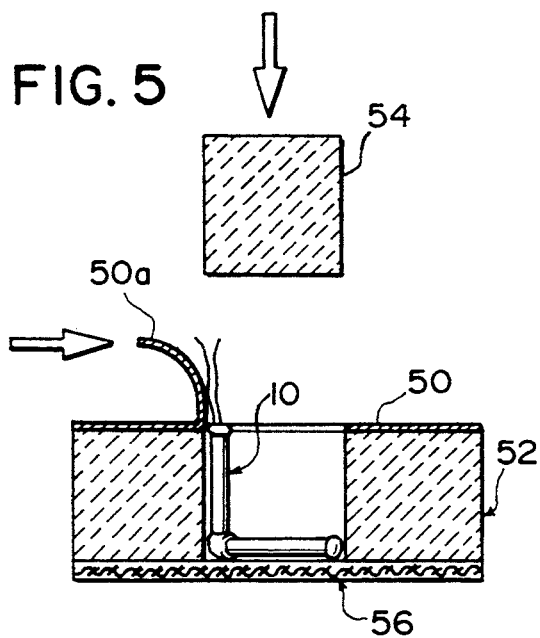
FIG. 5 is a partial sectional view taken along line 5—5 of FIG. 4, and showing reinsertion of the core square after installation of the sensor.
Figure 6:
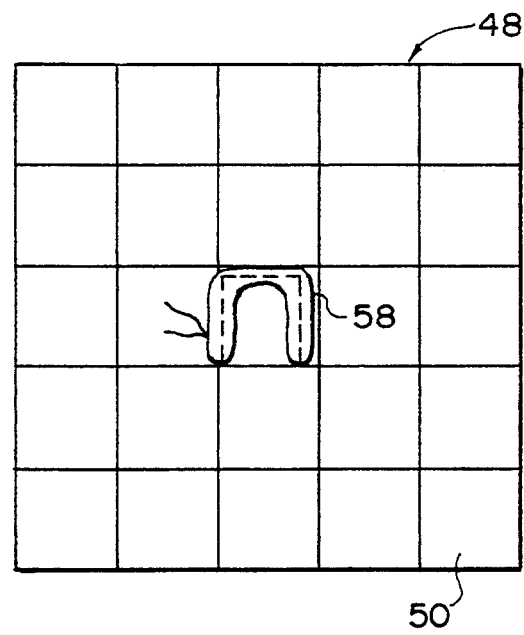
FIG. 6 is a top plan view of the CFBI after installation of the sensor and application of a sealant over the cut line.

Ceramic cement is then applied to the sensor 10 and to the inner surface of the outer layer 56. Then, the sensor is placed inside the core at a diagonal disposition as shown in FIGS. 4 and 5, and the square 54 is reinserted and the piece 50a is folded back over to its original position. The sensor leads are allowed to exit the core 52 and extend outwardly therefrom. Finally, as shown in FIG. 6, a sealant 58 is applied over the cut line. The sealant 58 is preferably room temperature vulcanizing type used to assemble the sensor.

Alternative installation steps can be used where different types of incisions can be used. In the above-described embodiment a cubic cut-out of core material was removed and then reinstalled. As an alternative, a triangular cut-out of core material could be formed, such that the apex of the triangle is at the inner surface of the outer layer. Then sensor can then be positioned at the apex. In either case, or where different incisions are made, it is desirable to place the sensor on the inner surface of the outer layer to obtain a reading of the surface temperature of the outer layer.

The sensor 10 as installed is capable of measuring temperature up to 3,200° F. in flexible insulation. The sensor can be employed in any environment where it is desirable to measure high temperatures at precise locations.

While advantageous embodiments have been chosen to illustrate the invention, it will be understood by those skilled in the art that various changes and modifications can be made therein without departing from the scope of the invention as defined in the appended claims.

I claim:

1. A sensor for measuring a temperature of a flexible member having first and second surfaces, comprising:
   a thermocouple wire element having first and second wire segments joined to form a junction and a pair of leads;
   a refractory sheath encasing the junction and at least a portion of the first and second wire segments; and
   means for securing the refractory sheath on the first surface of the flexible member with the junction juxtaposed the first surface, the second surface being exposed to a high temperature source,
   wherein the refractory sheath includes two ceramic sections, the two ceramic sections have juxtaposed, proximal ends and distal ends and are disposed at a right angle to each other, the junction being disposed outside and juxtaposed to the distal end of the first ceramic section and the pair of leads extending outwardly from the distal end of the second ceramic section, and
   wherein the sheath further comprises a ceramic cement joint between the juxtaposed proximal ends of the two ceramic sections to encase the thermocouple wires, and a ceramic cement cap provided on the distal end of the first ceramic section.

2. A temperature sensor according to claim 1, wherein the thermocouple wire element comprises a type R Platinum-Platinum/Rhodium thermocouple wire element.

3. A temperature sensor according to claim 1, wherein each of the two ceramic sections has a pair of longitudinal passages respectively receiving the first and second wire segments.

4. A temperature sensor according to claim 3, wherein each ceramic section is made of alumina.

5. A temperature sensor according to claim 1, wherein the ceramic cement joint is made of alumina.

6. A temperature sensor according to claim 1, further comprising first and second sleeves covering at least a portion of the first and second leads and abutting the distal end of the second ceramic section, and a sealant disposed between the first and second sleeves and the second ceramic section.

7. A temperature sensor according to claim 1, wherein the securing means comprises ceramic cement contacting the first surface of the flexible member and at least a portion of the sheath.

8. A temperature sensor according to claim 1, wherein the flexible member is an outer layer of a flexible blanket.

* * * * *